United States Patent [19]
Hotston

[11] 3,757,330
[45] Sept. 4, 1973

[54] MICROWAVE INTERFEROMETERS

[75] Inventor: Eric Stanley Hotston, Wantage, England

[73] Assignee: United Kingdom Atomic Energy Authority, London, England

[22] Filed: Nov. 29, 1971

[21] Appl. No.: 202,998

[52] U.S. Cl. .............................................. 343/12 R
[51] Int. Cl. ............................................... G01s 9/04
[58] Field of Search .................................. 343/12 R

[56] References Cited
UNITED STATES PATENTS

| | | | |
|---|---|---|---|
| 2,949,603 | 8/1960 | Logue | 343/12 R X |
| 2,934,756 | 4/1960 | Kalmus | 343/12 R |
| 3,508,046 | 4/1970 | Anton et al. | 343/12 R X |
| 2,510,710 | 6/1950 | Moore | 343/12 R X |
| 3,327,307 | 6/1967 | Miles | 343/12 R X |

*Primary Examiner*—Malcolm F. Hubler
*Attorney*—Larson, Taylor & Hinds

[57] ABSTRACT

This invention involves an interferometer arranged to measure the distance to a movable object. The interferometer includes a main wave guide for radiating electromagnetic waves towards the object and for receiving the electromagnetic wave after reflection from the object, and a secondary wave guide system, including detectors coupled to the main wave guide in order to receive components of both the radiated and reflected waves. By appropriate positioning of the coupling between main and secondary wave guides, detectors in the secondary wave guide system can readily determine the distance of an object.

8 Claims, 24 Drawing Figures

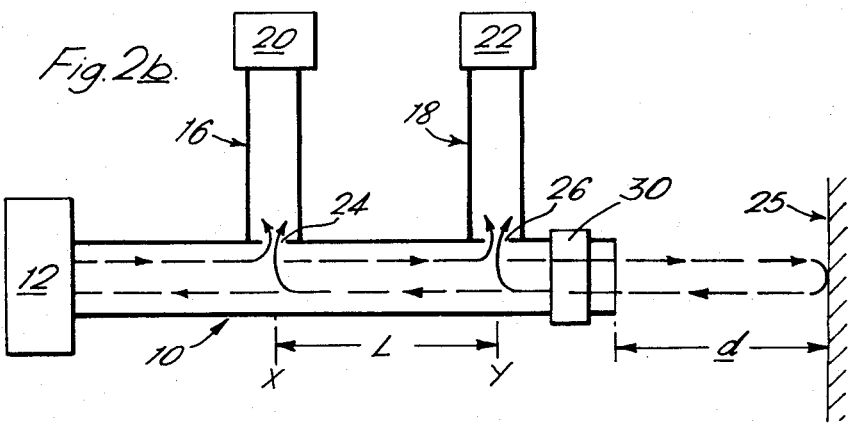
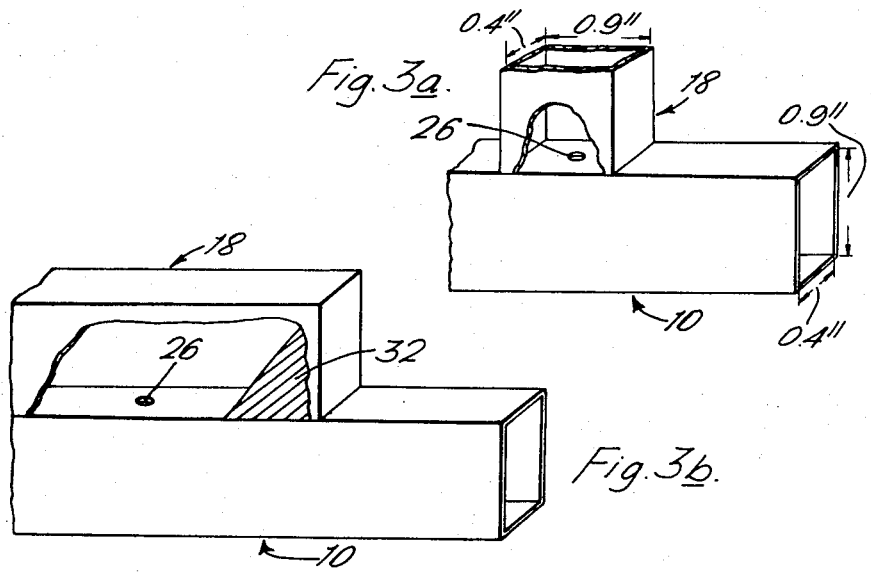
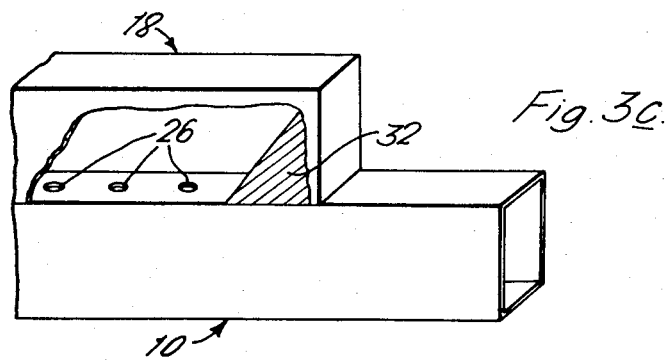

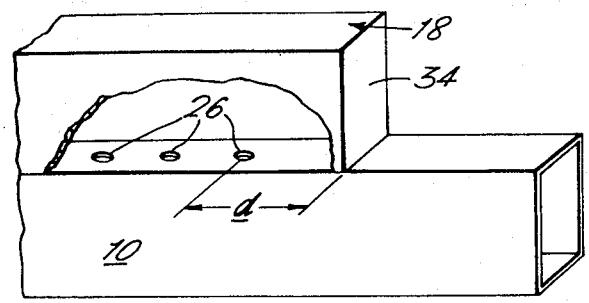
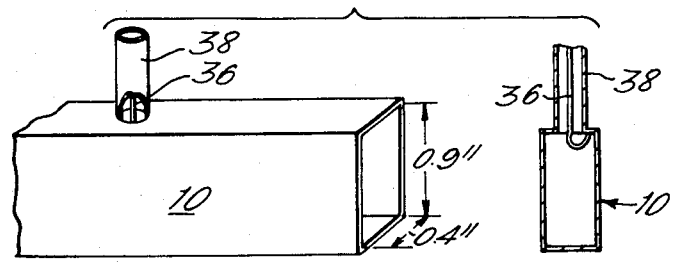
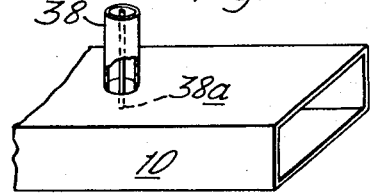
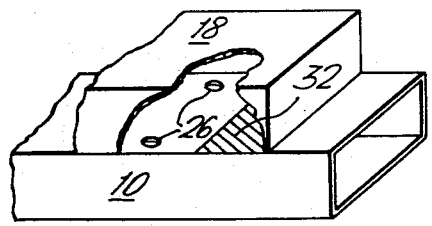
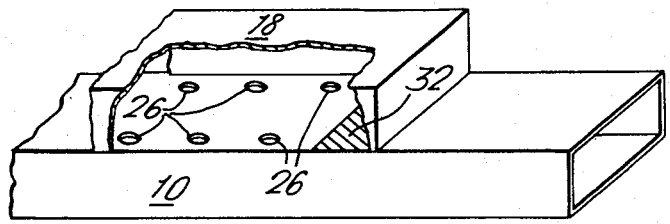

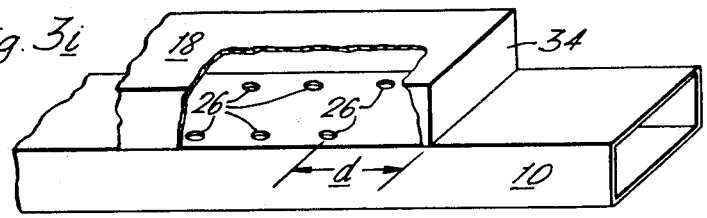
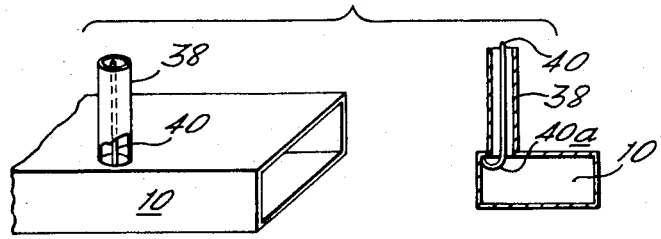
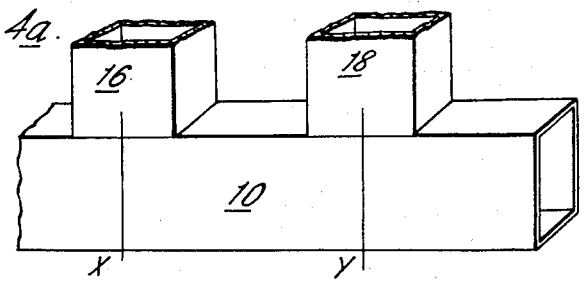
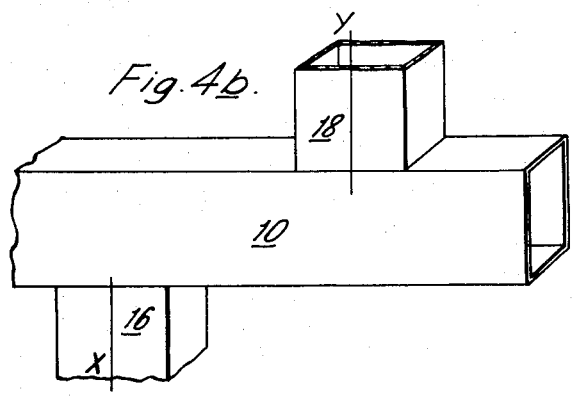

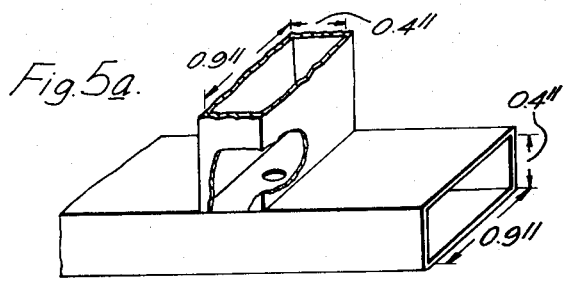
Fig. 5a.
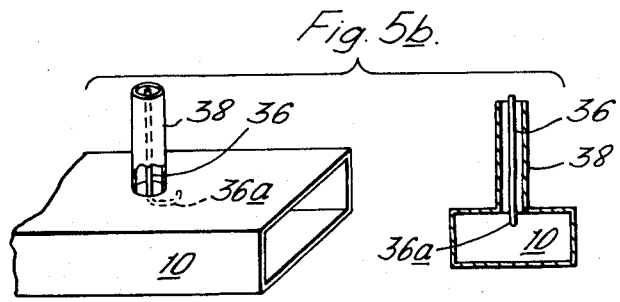
Fig. 5b.
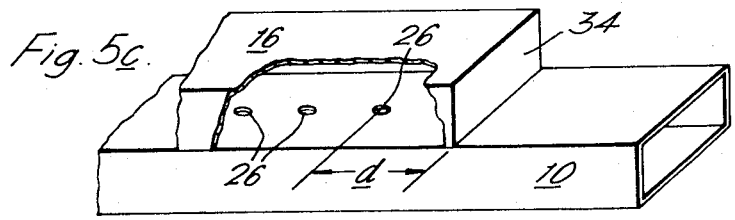
Fig. 5c.
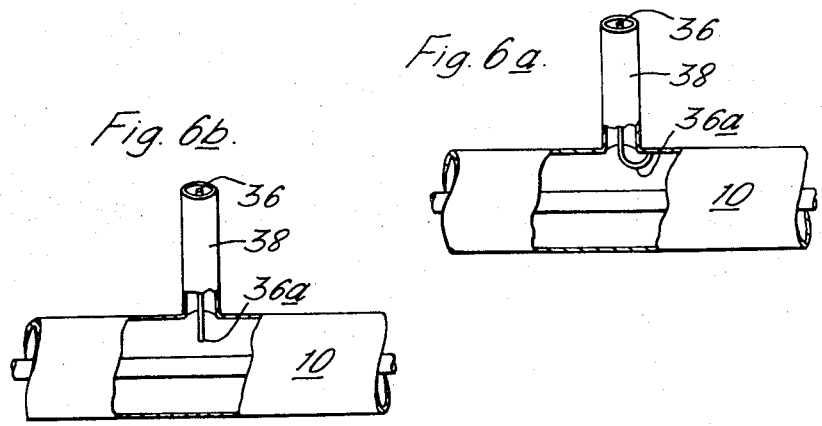
Fig. 6a.
Fig. 6b.

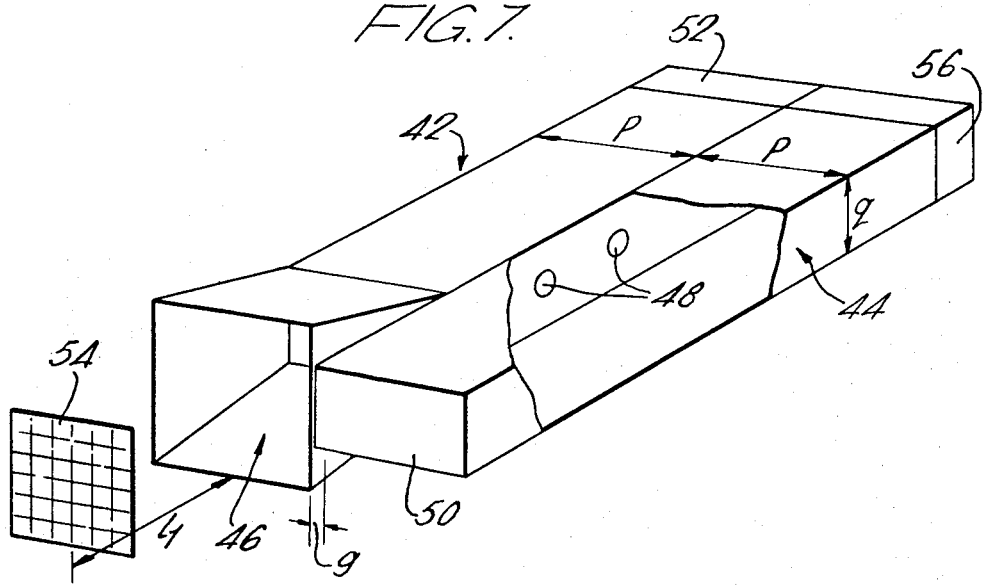
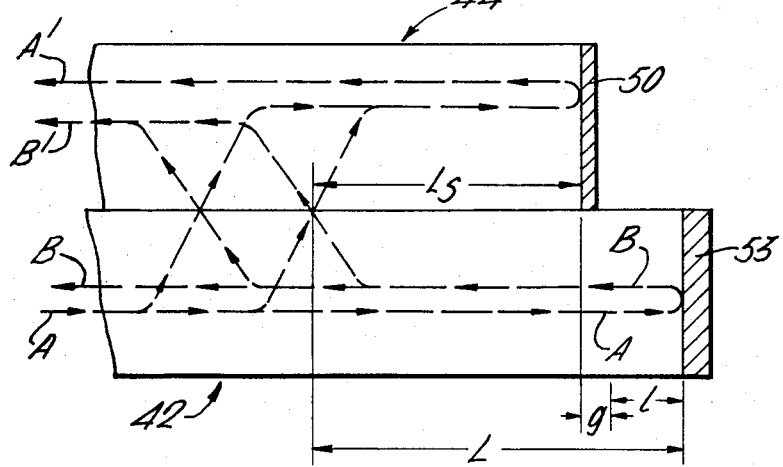

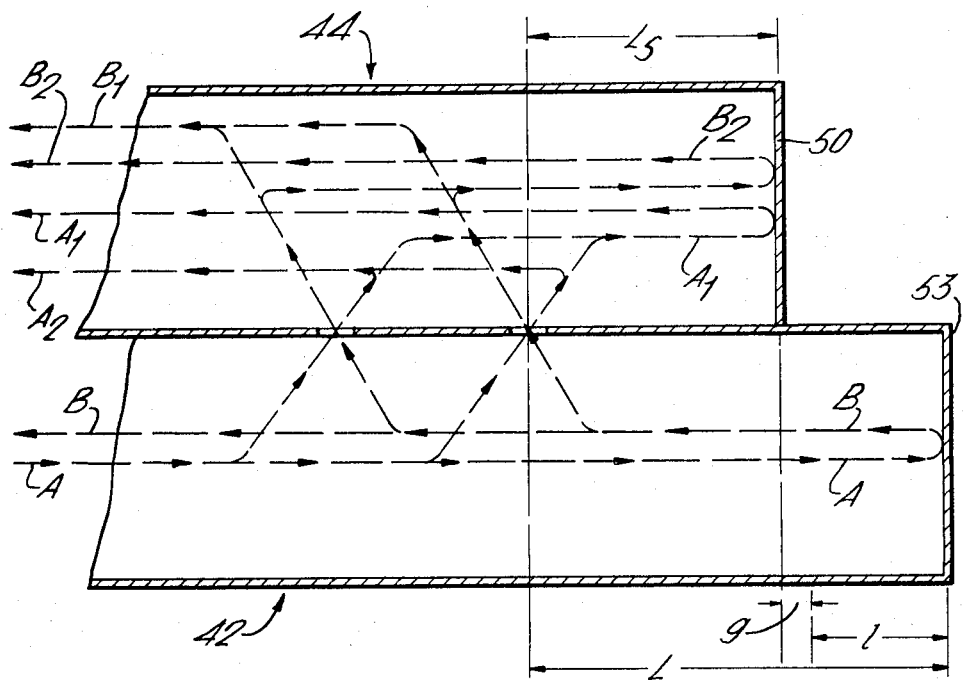

MICROWAVE INTERFEROMETERS

BACKGROUND OF THE INVENTION

1. Field of the Invention

The invention relates to microwave interferometers, such as for measuring the phase of a reflected wave or to determine the location of a reflecting object, for example.

2. Description of the prior art

A previously proposed interferometer for measuring vibrations of a moving object consists of a carcinotron oscillator for transmitting an electromagnetic wave along a first wave guide towards the moving object. A beam splitter is located at an intermediate point along the first wave guide. Two further wave guides extend from opposite sides of the beam splitter in directions perpendicular to the first wave guide. One of the two further waveguides is terminated by a movable short circuit and the other is terminated by a detector. In operation, the electromagnetic wave is passed along the first wave guide until it meets the beam splitter. One half of the electromagnetic wave passes through the beam splitter to the object to be measured while the other half of the wave is deflected along one of the further wave guides to the short circuit. The waves which are then reflected by the short circuit and the object respectively are returned to the beam splitter whence components of the reflected waves are directed along the other further wave guide towards the detector.

An oscilloscope connected to the detector displays the vibrations of the moving object.

A disadvantage of the system is that it involves the use of hybrid junctions which are both costly and difficult to set up accurately.

It is an object of the present system to provide a simple and accurate interferometer which avoids the use of hybrid junctions.

SUMMARY OF THE INVENTION

According to the invention there is provided a microwave interferometer comprising first wave guide means, second wave guide means, coupling means arranged whereby an electromagnetic wave in one wave guide means excites a secondary wave in the other wave guide means, detecting means for detecting the secondary wave in the other wave guide means, the said one wave guide means being arranged so as to radiate the electromagnetic wave therein towards a reflective target lying an unknown distance away, that the secondary wave is a complex signal which includes components of the radiated and reflected waves, said complex signal being indicative of the distance of the target from the interferometer.

According to the invention, there is further provided a microwave interferometer, comprising a main wave guide along which an electromagnetic wave can be propagated and reflected back from a movable object, first and second side wave guides non-reflectively and weakly coupled to the main wave guide at spaced positions therealong to receive energy from a standing wave pattern set up in the main wave guide, and first and second detectors respectively connected to measure the amplitudes of the waves coupled into the side wave guides, the distance along the main wave guide between the two side wave guides being such that the phase difference between the waves respectively set up in the two side wave guides is an odd number of $\pi$ radians when there is substantially no loss due to the reflection of the wave from the movable object.

According to the invention there is yet further provided a method of measuring the distance $d$ of an object from a predetermined point, comprising the steps of propagating an electromagnetic wave past said predetermined point to said object, reflecting said electromagnetic wave from said object substantially without loss back past said predetermined point to set up a standing wave, measuring the magnitude $A_1$ of said wave at said predetermined point, measuring the magnitude of $A_2$ of said wave at a position such that the phase difference between the two measured signals is an odd number of $\pi$ radians, and determining the distance of the object from the predetermined point from the formula $$\cos 2\phi = \pm [E + 1/E] \cdot (A_1^2 - A_2^2)/(A_1^2 + A_2^2)$$

where $$2\phi = 4\pi d/\lambda g$$

where $\lambda g$ is the wavelength of the electromagnetic wave and $E$ is the loss factor due to reflection of the wave.

According to the invention there is still further provided a method of measuring an unknown distance of a target, comprising the steps of propagating an electromagnetic wave along a first path to the target, receiving the radiated wave after reflection from the target along the first path, coupling the radiated and reflected waves into a second path in such a manner that they interfere to set up a complex wave-form along the second path, and measuring the complex wave-form to give a reading indicative of the distance of the target.

BRIEF DESCRIPTION OF THE DRAWINGS

FIGS. 2a and 2b show microwave phase shifters incorporated in the interferometers of FIGS. 1a and 1b respectively;

FIGS. 3a to 3k show different ways of coupling the main wave guide of the interferometers to the side wave guides;

FIGS. 4a and 4b shows coupling attitudes between the main and side wave guides;

FIGS. 5a to 5c show further ways of coupling the side wave guide of the interferometers with the main wave guide;

FIGS. 6a and 6b show the interferometers when the main wave guide and the side wave guide comprise coaxial lines;

FIG. 7 is a perspective view of a further form of the microwave interferometer of FIG. 1;

FIG. 8 is a longitudinal section of a model simulating the interferometer of FIG. 7; and FIG. 9 is a longitudinal section of the simulated model of FIG. 8 under different operating conditions.

FIG. 1a shows a microwave interferometer having a main wave guide 10 of rectangular cross-section and along which a microwave generator 12 can transmit microwaves.

Figure 1A:
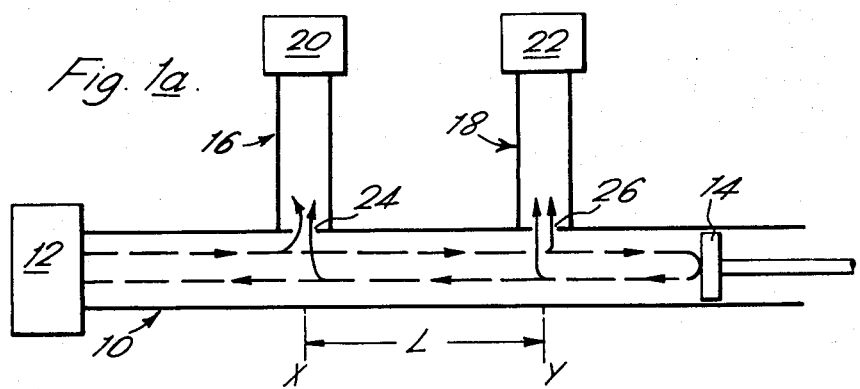
FIG. 1a is a longitudinal section through one of the interferometers, which houses a movable piston.

The main wave guide 10 houses a piston 14 which is arranged to reflect transmitted microwaves back along the main wave guide 10 towards the generator 12. Two side wave guides 16 and 18 extend from the same side of the main wave guide respectively at positions X and Y in a direction perpendicular to the longitudinal axis or direction of propagation of the main wave guide 10. The side wave guides 16 and 18 are separated by a distance L and are respectively coupled to the main wave guide 10 by apertures 24 and 26 in the wall of the main wave guide. Non-reflecting microwave detectors 20 and 22 are provided at the ends of respective side wave guides 16 and 18 for detecting the incident microwave energy thereon.

Figure 1B:
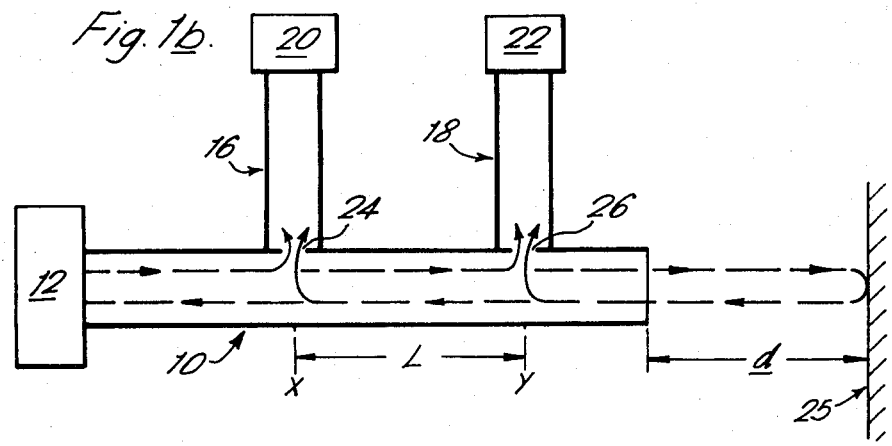
FIG. 1b is a longitudinal section through another of the interferometers, which transmits and receives waves to and from a reflector.

In FIG. 1b parts similar to those in FIG. 1a are similarly referenced but here, instead of the reflecting piston 14, the main wave guide 10 is terminated in radiating means and arranged to transmit microwaves to a reflector 25. The reflector 25 is located at an unknown distance $d$ from the open end of the main wave guide 10.

The operation of the interferometer of FIG. 1b will now be described. The operation of the interferometer of FIG. 1a will be readily apparent from the description of FIG. 1b.

The generator 12 causes a wave of amplitude A to be propogated in the TE mode from left to right (as viewed in FIG. 1b) along the main wave guide 10. The radiating end of the wave guide 10 acts as an aerial system and beams a proportion of the energy in the wave towards the reflector 25. The reflector 25 reflects the incident energy back towards the aerial system which passes a proportion (according to a loss factor E) of the energy into the main wave guide 10 where it produces a wave propagating from right to left (as viewed in FIG. 1b) in the main wave guide. The phase relationship of the incident wave (travelling left to right) and the reflected wave (travelling right to left) is a function of the distance $d$.

The incident and reflected waves in the main wave guide will combine to produce a standing wave pattern. The two side wave guides 16 and 18 are arranged to be weakly coupled to the main wave guide by a coupling factor $\alpha$ so that only a small proportion of the energy in the main wave guide is transferred to the side guides to be measured by the detectors. The wave guide junctions are arranged to be symmetrical so that the degree of excitation in the side guides is independent of the direction of propagation in the main guide.

Let it be assumed that the phase change of the transverse electric field of the wave as it propagates from the Y junction to the reflector 25 and back is $2\phi$. The angle $\phi$ is a function of the frequency of the electromagnetic radiation, the wave-length in the waveguide, the dielectric constant of the medium separating the end of the waveguide from the reflector, and the position of the reflector relative to the position Y.

In the case of FIG. 1a, $2\phi$ is given by
$$2\phi = (4\pi d/\lambda g) \pm \pi,$$
where
$\lambda g$ is the wavelength in the main waveguide. The $-ve$ value of the sign of 90 will be taken.

In the case of FIG. 1b the relation between $\theta$ and $d$ (where $d$ is now the separation of the reflector from the end of the waveguide), is more complicated but it can be determined either theoretically or experimentally. If the main waveguide supports a TE wave and if $d << \lambda$, where $\lambda$, is the wavelength of the electromagnetic wave in the medium between the end of the waveguide and the reflector, then it can be shown that when the junctions X and Y couple the transverse electric field then:
$$2\phi = C_1 + (4\pi d/\lambda g) \tag{1}$$
where
$C_1$ is a constant $(C_1 \sim (4\pi d_1/\lambda g) \pm \pi)$
This result is obtained using the standard technique of the transformation of wave impedances and neglects the lumped reactance due to the discontinuity at the end of the waveguide; experiment shows that this neglect is justified.

Now let it be assumed that the distance L between the two side wave guides 16 and 18 is $(2n + 1) \lambda g/4$ where $n$ is a whole number. Then the amplitude $A_2$ of the wave propagated in the side wave guide 18 can be written as
$$A_2 = |A\alpha(1 - \alpha^2)^{1/2} [1 + E(1 - \alpha^2) \exp j2\phi]| \tag{2}$$

and similarly the amplitude $A_1$ of the wave propagated in the side wave guide 16 can be written as
$$A_1 = |A\alpha[1 + E(1 - \alpha^2)^{3/2}\ ^{expj}[(2n + 1)\pi + 2\phi]]| \tag{3}$$

If the coupling factor is very much less than unity then equations (2) and (3) can be combined to produce the equation
$$-[A_1^2 - A_2^2/A_1^2 + A_2^2] = (2E/1+E^2) \cos 2\phi \tag{4}$$

If we make $(A_2^2 - A_1^2)/(A_1^2 A_2^2) = S$ then equation (4) can be rewritten as
$S = (2E/1 + E2) \cdot \cos 2\phi$
The junctions at X and Y can be coupled to components other than the transverse electric field so that a more general formula would be as follows:
$\cos 2\phi = \pm \frac{1}{2}[E + (1/E)] S$
The condition for maximum sensitivity G of the equation
$S = [2/(E + 1/E)] \cdot \cos 2\phi$
is determined by differentiating S with respect to G:
$G = dS/d\phi = -[4/(E + (1/E)] \cdot \sin 2\phi$
The maximum sensitivity is when $dG/d\phi = 0$, that is, when $\cos 2\phi = o = S$.

Now if the reflector 25 is both planar and highly electrically conductive and therefore highly reflective, the value of E for the reflected wave is approximately unity. This being the case, then small variations in the value of E will not produce a significant change in the value of the term $(E + 1/E)$. This means that the determination of $2\phi$ is substantially insensitive to variations in the value E.

The terms $A_1^2$ and $A_2^2$ can be directly measured by respective microwave detectors 20 and 22. For example if each detector comprises a video crystal, the output therefrom is approximately proportional to the square of the incident wave.

Thus the distance $d$ can be determined from the measurement of $\phi$, in terms of $d$, from Equation 5, and then using Equation 1 if applicable, or by comparison with the results of a previous calibration experiment. The sign to be taken from Equation 5 depends on the type of junction at Y as explained below.

If the reflector 25 is caused to vibrate about the plane of the reflecting surface shown in FIG. 1b then the value of $d$ will also vary and the variations can be determined by a study of the outputs of the two microwave detectors 20 and 22.

Figure 2A:
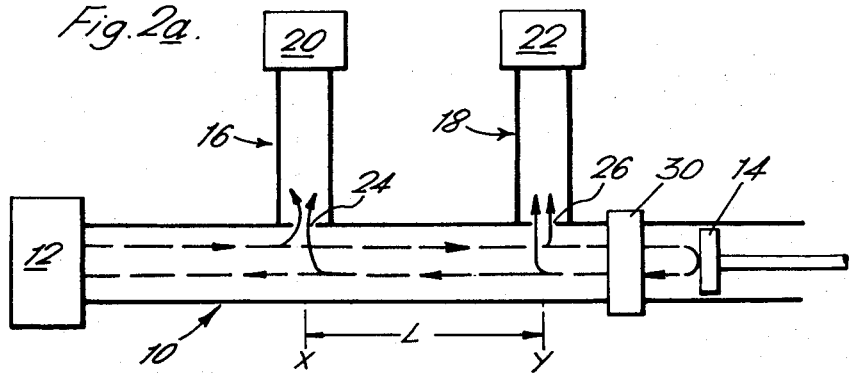

The condition of maximum sensitivity of the interferometer occurs when $S = 0$. Thus when investigating the movement of a vibrating object, maximum sensitivity can be obtained by arranging the dimensions of the interferometer to make $S = 0$ when the vibrating object is at its means position. Instead a microwave phase shifter 30 (See FIGS. 2a and 2b) can be incorporated into the main wave guide 10 and adjusted until $S = 0$, when the vibrating object is at its mean position.

Specific designs of interferometers will now be described in conjunction with FIGS. 3a to 6b. Components similar to those in FIGS. 1a and 1b are similarly referenced.

FIG. 3a shows the main wave guide 10 which comprises a rectangular metal tube having internal dimensions of 0.400 × 0.900 inches (standard Britich Wave Guide No. 16). The interferometer is arranged to operate at a frequency of 10,000 Mc/s. The side wave guide 18 comprises a rectangular metal tube having the same cross-section as the main wave guide 10. The size of the hole 26 which provides communication between the side and the main wave guide is determined by two main factors, namely:

a. The holes must be small enough to cause little or no disturbance to the waves propagating in the main guide.

b. The holes must be large enough to couple sufficient energy into the side guides to give a sizeable enough signal to be measurable. This last condition is determined by the power output from the microwave generator 12, the minimum phase change that it is desired to detect, and the time taken for making a measurement.

Another factor which should be taken into account when determining the hole size is the thickness of the metal through which the hole extends.

Thus the determination of hole size is a matter for experiment. In the example shown in FIG. 3a, the hole is less than 4mm. in diameter. The holes need not be circular but can instead comprise slits extendng in a plane which lies perpendicular to the direction of propagation in the main wave guide.

If $p$ is the larger dimensions of the wave guide, and the microwave generator propagates a wave down the main wave guide in the $TE_{0l}$ mode, then the wavelength $\lambda g$ of the wave in the main wave guide can be determined from the expression $$1/\lambda g^3 = (K/\lambda o^2) - (1/(2\rho)^2$$

where $\lambda o$ is the wavelength of the wave in free space and K is the dielectric constant of the medium filling the wave guide.

FIG. 3b shows a modification of FIG. 3a in which the side guide runs parallel to the main gudie, the narrow longitudinal faces of the guides being in contact and the coupling hole lying on the centre line of the narrow longitudinal faces. The right hand end of the guide is filled with microwave absorbing material 32 to prevent reflections from the right hand wall.

FIG. 3c shows a modification of FIG. 3b in which several coupling holes have been formed between the two wave guides. The holes are spaced apart a distance of $(m \cdot \lambda g)/2$ (where $m$ is a whole number) along the centre line of the common wall of the two guides. In this arrangement the hole nearest the load (right hand side) is taken as defining the position of the junction between the two guides.

FIG. 3d shows a modification of FIG. 3c in which the microwave absorbing material is removed and the right hand end wall 34, which forms a microwave reflector, is positioned a distance $[(r/2) + (¼)] \lambda g$ from the nearest coupling hole (where $r = 0, 1, 2 \ldots n$). The number of coupling holes in this case is unimportant; one would suffice.

FIG. 3e and 3f show the case where the side wave guide comprises a coaxial line. In FIG. 3e the coaxial line communicates with the narrow side of the main wave guide, and the central conductor 36 has an end portion 36a which extends into the main wave guide and is looped back to form an arc with its end fastened to the inside of the main wave guide. The loop formed by the end portion 36a lies in a plane which is perpendicular to the direction of propagation inside the main wave guide.

In FIG. 3f the coaxial line communicates with the broad side of the main wave guide, and the central conductor 38 of the coaxial line has an end portion 38a which projects into the main wave guide.

FIGS. 3g to 3i are respectively analogous to FIGS. 3b to 3d. Here instead of the wave guides having their narrow sides forming a common wall they have their broad sides forming the common wall. In addition, instead of having a single row of holes, two rows of holes are provided running adjacent opposite edges of the common wall. The criteria for determining the relative positions of the holes in each row is the direction of wave propagation are, however, the same as those described in conjunction with FIG. 3b to 3d.

FIG. 3k shows the side guide as comprising a coaxial line which communicates with the main wave guide through the face thereof. The coaxial line is placed adjacent one of the edges of the broad face. The central conductor 40 of the coaxial line has an end portion 40a which extends into the main wave guide and is looped so that its end is secured to the inside of the main wave guide at the junction between the braod and narrow surfaces. The loop formed by the portion 40a is arranged to be in a plane which extends perpendicular to the direction of propagation in the main wave guide.

The couplings shown in FIGS. 3c, 3d, 3i and 3h are narrow band couplings since only at one particular frequency will they couple waves independently of the direction of propagation.

The remaining couplings shown in FIGS. 3a, 3b, 3f, 3e, 3g and 3k are broad band couplings since they are independent of the direction of propagation in the main guide over a wide range of frequencies. However, the absolute degree of coupling can be frequency-sensitive.

The couplings of FIGS. 3a to 3i are interchangeable with each other. Any one can be used to provide a coupling at position Y, (FIG. 1) and the same or any other coupling can be used to provide a coupling at position X provided the junctions are balanced as hereinbefore described. The critical value of L is $(n + ½)\lambda g/2$ so as to enable Equation (5) to be satisfied. The side of the main guide on which the side wave guides are situated is not important. FIGS. 4a and 4b show two ways of joining the side guide to the main guide which produce the equivalent effect.

FIG. 5a shows another way of joining the side wave guide to the main wave guide, the side guide being perpendicular to and abutting the broad face of the main wave guide. FIG. 5b shows a way of joining coaxial cable to the broad face of the main guide. The inner conductor extends into the main wave guide and forms a loop in a plane containing the axis of wave propagation. FIG. 5c shows a way of joining two parallel wave guides together along their broad faces with holes along the centre line of the face of the main wave guide. The junction of FIG. 5c is narrow band and those of FIGS. 5a and 5b broad band.

The junctions of FIGS. 5a to 5c are interchangeable with each other. Any one can be used as the junction at Y and any as the junction at X. When these junctions are used the value of L must be $(n + \frac{1}{2})\lambda g/2$ and Equation (5) takes the form $$\text{Cos } 2\phi = -\frac{1}{2} [E + (1/E)] S \qquad \text{5a.}$$

As before, the junctions can be situated on the same or opposite sides of the main wave guide.

If a coupling from one of FIGS. 3a to 3i is used as the junction at Y and one from the group of FIGS. 5a to 5c used as the junction at X, the value of L required is $(n-1)\lambda g/2, (n=1,2,3 \text{ etc.})$, for Equation (5) to be satisfied. Although in FIG. 1 the junction at y is shown as being nearer to the reflector there is no need for this to be so. The junction at X could be nearer; however $\phi$ is always measured at Y.

When the main wave guide comprises a coaxial line (see FIGS. 6a and 6b) the side wave guides also comprise coaxial lines which extend in a direction perpendicular to the main wave guide. FIG. 6a shows a magnetic coupling in which the central conductor of the side guide wave extends into the main guide wave and is looped in a plane containing the central conductor of the main wave guide. FIG. 6b shows an electric coupling in which the central conductor of the side wave guide extends into the main wave guide perpendicular to the central conductor of the main wave guide.

If only electric field couplings are used, the side wave guides must be placed a distance of $(n+\frac{1}{2})\cdot(\lambda g/2)$ apart for Equation (5) to be satisfied.

If only magnetic field couplings are used, the side guide waves must be placed a distance of $(n+\frac{1}{2})\cdot(\lambda g/2)$ apart for Equation (5) to be satisifed. If the coupling at Y is electric and that at X magnetic then the value of L required is $(n-1)\lambda g/2$ for equation (5) to remain valid.

The rule for the choice of sign in Equation 5 is as follows: when the wave guide junction at Y is chosen from FIGS. 3a to 3k or 6b, $\text{Cos } 2\phi = \frac{1}{2}[(E + (1/E)]S$, otherwise $\text{Cos } 2\phi = -\frac{1}{2} [E + (1/E)] \cdot S$.

It will be seen that the distance L is in each case such that the phase difference between the waves respectively set up in the two side wave guides 16, 18 is $\pi (2n + 1)$ radians when E is unity.

The interferometers described can be used to measure the instantaneous positions of objects which are vibrating, moving very slowly or which are static.

A modified mode of operation will now be described in conjunction with an interferometer similar to that described above but which has a junction at X similar to that shown in FIG. 3a and a junction at Y similar to that shown in FIG. 5a; the junctions X and Y lie equidistant from the end of the waveguide.

The interferometer is then cyclically energised by two signals having different frequencies, the first signal having a frequency $f$ and energising the interferometer for alternate cycles and the second signal having a frequency $f + \Delta f$ and energising the interferometer during intervening cycles. The frequency at which the signals are cycled is such that the phase change $2\phi$ of the reflected wave in the main waveguide is not altered appreciably over one cycle.

When the interferometer is operating at frequency $f$, the phase change of the reflected wave measured at Y is $2\phi$ so that the output of the corresponding detector is $Ay$. When the interferometer operates at frequency $f + \Delta f$, the phase change becomes $2(\phi + \Delta \phi)$ and the output of the detector becomes $Ay + \Delta Ay$. Similarly the output of the detector corresponding to the position X changes from $Ax$ to $Ax + \Delta Ax$ with the change of frequency from $f$ to $f + \Delta f$.

If it is then assumed that the degree of coupling between the main and side guides as well as the factor E are independent of frequency, then Equation (1) can be rewritten as $$\text{Cos } 2\phi = \frac{1}{2}\left[E + \frac{1}{E}\right] \frac{\frac{1}{Ax}\frac{\Delta Ax}{\Delta f} + \frac{1}{Ay}\frac{\Delta Ay}{\Delta f}}{\frac{1}{Ax}\frac{\Delta Ax}{\Delta f} - \frac{1}{Ay}\frac{\Delta Ay}{\Delta f}}$$

so that $$s = \frac{\frac{\Delta Ax}{Ax} + \frac{\Delta Ay}{Ay}}{\frac{\Delta Ax}{Ax} - \frac{\Delta Ay}{Ay}}$$

Using this method of determining $2\phi$, the junctions at X and Y need not be balanced, the result is independent of the exact value of $\Delta f$, and the sensitivity of the interferometer is substantially independent of the sensitivity of the detectors, or of any attenuation in the side waveguides, provided that these quantities do not vary greatly over the frequency band of $f$ to $f + \Delta f$.

It will be appreciated that $\phi$ can be measured as a function of $(1/Ax (\Delta Ax/\Delta f) \pm (1/Ay) (\Delta Ay/\Delta f)$ if a scale is produced and calibrated using known values of $\phi$.

However the value of $\Delta f$ in this case will have to be accurately determined.

FIG. 7 shows another interferometer. The interferometer includes a main wave guide 42 which is coupled to a generator 52 at one end. The other end of the main wave guide 42 terminates in a horn 46 and is arranged to transmit electromagnetic waves to a reflective target 54 lying a distance $l_1$ from the horn. A second wave guide 44 is mounted on the first wave guide 42 and coupling between the two wave guides occurs through a series of holes connecting the interiors of the two guides. These holes are arranged to form a directional coupler in a manner well known. In FIG. 7 a two hold coupler is shown having two similar cou;ling holes 48. One end of the second wave guide 44 is terminated by a reflector 50, and a detector 56 is connected at the other end of the second wave guide 44 to detect the amplitude of the resultant wave which is propagated along the second wave guide 44. The reflector 50 and the distal end of the horn lie a distance $g$ apart.

The internal cross-section of the main wave guide 42 is rectangular with sides of length $p$ and $q$; $p$ is slightly greater than $2q$. The guide 42 is fitted with a homogenous material having a dielectric constant K$r$.

The wave number $b$ of the wave which can be propagated along the main wave guide at a selected frequency can be determined from the Equation $$b^2 = K_r b_o^2 - (\pi/p)^2 \quad (6)$$

where $b_o$ is the wave number of the wave having the same frequency as the generator and propagating in free space.

The wave defined by Equation (6) represents a wave propatating in the $TE_{o1}$ mode and has an electric field directed parallel to the wave guide side with the dimension $q$. Since $p > q$, waves of the $TE_{o1}$ mode will normally be the only ones to propagate.

In operation, the wave guide 42 will have a first wave propagated along it from one end by the generator 52 and a second wave propagated along it from the other end. The second wave comprises the propagated wave after reflection by the target.

The resultant wave in the main wave guide can be simulated by extendingg the main wave guide, at its end remote from the generator, by a distance $l$ and terminating the extended wave guide by a reflector 53 (see FIG. 8 in which parts similar to those in FIG. 7 are similarly referenced).

The distance $l$ can be determined from the following approximate equation $$\tan bl/b = \tan b_1 b_1/b \quad (7)$$

where $b_1 = b \cdot \sqrt{K_1}$ and $K_1$ is the dielectric constant of the medium between the mouth of the horn 46 and the target.

The above Equation holds true if
$l_1$ is less than $q^{-2} b_1/2 \pi$

If $l_1$ is small, then $b_1 \cdot l_1 \Omega \tan b_1 \cdot l_1$ and the dependence of $l$ upon the value of $K_1$ is not great.

The coupling holes 48 between the two wave guides in accordance with the directional coupling theory are spaced an odd multiple of $\pi/2b$ apart. The coupling holes 48 provide for directional coupling, that is a wave A propagating in the main wave guide in one direction will only excite a wave $A_1$ along the second wave guide to travel in the same direction (the wave $A_1$ is then reflected by reflector 50). Similarly a wave B (derived in fact by reflection of wave A from reflector 53) propagating along the main wave guide in the other direction will only excite a wave $B_1$ along the second wave guide to travel in this other direction.

By making the coupling holes 48 small, the energy transferred from the main wave guide 42 to the second wave guide 44 will also be small.

The wave $A_1$ excited in the second wave guide is proportional to the wave A generated by the generator in the main wave guide, and the wave $B_1$ in the second wave guide is proportional to the wave B reflected at the reflection 53 in the main wave guide. The wave $A_1$ after reflection at the reflector 50 in the second wave guide combines with the wave $B_1$ to produce a complex wave. The power S of the complex wave when it reaches the detector (not shown) can be determined from the following equation $$S = 1 + a^2 + 2a \cos b (Ls - L) \quad (8)$$

where
$Ls$ is the distance of the reflector 50 from the nearest coupling hole, L is the distance of the reflector 53 from the same coupling hole and $a$ is a factor representative of the loss in amplitude that the wave suffers at the reflector 53 in changing from A to B.

It will be seen therefore that S is a function of the distance L and therefore the distance $l_1$ of the interferometer from the target (see Equation 7). The detector 56 can be calibrated to give an output representative of the value of $l_1$.

Because S is determined by the interference of two waves, one reflected by the target 54 and the other reflected by the reflector 50, and because the waves have substantially similar path lengths through the interferometer, the main errors resulting from temperative variation result from a change in the value of $b$ and a change in directional coupling properties of the coupling holes.

In the case of an imperfect directional amplifier, where the degree of imperfection is not too great, the operation of the interferometer is slightly modified. FIG. 9 shows the case where the operating conditions are such that the coupling properties of the holes are no longer those of a perfect coupler. In FIG. 9, parts similar to those in FIG. 8 are similarly referenced. The effect of the loss of directivity is to cause the wave A to excite not only the wave $A_1$ as before in the second wave guide but also a wave $A_2$ travelling in the opposite direction. Similarly the wave B will excite not only the wave $B_1$ as before but also a wave $B_2$ travelling in the opposite direction to the wave B.

The complex signal detected by the detector now has components $A_1$, $A_2$, $B_1$ and $B_2$ so that the output of the detector will be a function both of $b \cdot Ls$ and $b \cdot (Ls - L)$.

By appropriate selection of the value of $Ls$ the change in output of the detector resulting from temperature variations at the coupling holes can be minimised as will now be described.

The optimum value of $Ls$ can be determined by calculating the detector output as a function of $l_1$ for different values of $Ls$ for a range of values of $b$, and then choosing that value of $Ls$ which gives the least change with $b$.

Instead the interferometer can be operated in a switched frequency mode, that is a mode in which the generator is switched between two frequencies $f$ and $f + \Delta f$ at a cycling frequency $fc$. The frequency $fc$ is arranged to be such that any movement of the target in a period of $1/fc$ is negligible.

The output of the detector during operations at respective frequencies $f$ and $f + \Delta f$ will be $\theta$ and $\theta + \Delta \theta$, where $\theta$ is a function of $l_1$.

If $\Delta \theta/\theta$ is determined over the range of $b$ to $b_1$ and for the range in values of $l_1$ at which the interferometer is desired to operate, there will be a value of $Ls$ for which $\Delta \theta/\theta$, when expressed as a function of $b$ and $l_1$, will be substantially independent of small variations in $b$.

It will be appreciated that, since the ratio $\Delta \theta/\theta$ can be used to determine the value of $l_1$, the results obtained will be independent of the output of the generator and the value of the sensitivity of the detector. There will also be a degree of immunity to changes in the attenuation in the wave guide or other feeder systems which transport energy from the generator to the interferometer and from the interferometer to the detector.

In a modification the end of the second wave guide which includes the reflector 50 can be horn shaped.

In another modification, the detector and the generator can be transposed.

Another modification is that the wave guides need not be filled with the same dielectrics, they could be filled with a mixture of several dielectrics in which case Kr in equation 6 is a mean value. Provided the wave numbers in the guides 42, 44 of FIG. 7 are the same in the region of the coupling holes the interferometer will still operate. Away from the coupling holes the wavenumbers need not be the same as corresponding points in the two wave guides although in practice they will be within 10 percent of each other, even if the wave numbers are nearly equal their temperature coefficients may vary greatly this effect must be allowed for in making the above calculations. By a suitable choice in the mixture of the dielectrics filling the wave guides it is possible to extend the temperature range over which compensation is possible, the design being largely empirical.

I claim:
1. A micro-wave interferometer, comprising
   a main wave guide,
   generating means for successively propagating along the main wave guide electromagnetic wave having frequencies respectively equal to $f$ and $\Delta f$ for reflection back from a movable object,
   first and second side wave guides,
   first and second couplings non-reflectively and weakly coupling the first and second wave guides to the main wave guide at spaced positions therealong to receive energy from the resulting standing wave patterns set up in the main wave guide, and
   first and second detectors respectively connected to the two side wave guides to measure the respective amplitudes $Ay$ and $Ax$ of the waves coupled into the side wave guides when the electromagnetic wave has the frequency $f$, and to measure the respective amplitudes $Ay + \Delta Ay$ and $Ax + \Delta Ax$ of the waves in the two side wave guides when the electromagnetic wave has the frequency $f + \Delta f$, whereby to enable the distance d to be determined from the formula

$$\cos 2\phi = \pm \left(E + \frac{1}{E}\right) \frac{\frac{\Delta Ax}{Ax} + \frac{\Delta Ay}{Ay}}{\frac{\Delta Ax}{Ax} - \frac{\Delta Ay}{Ay}}$$

where $\phi$ and E are as hereinbefore defined, the distance along the main wave guide between the two side wave guides being such that the phase difference between the waves respectively set up in the two side wave guides is an odd number of $\pi$ radians when there is substantially no loss due to the reflection of the wave from the movable object.

2. An interferometer according to claim 1, wherein the main wave guide includes a phase shifter mounted therein to vary the sensitivity of the interferometer.

3. An inteferometer according to claim 1, wherein the main wave guide and the side wave guides comprise coaxial lines.

4. An interferometer according to claim 1, wherein the main wave guide is open-ended and arranged to transmit and receive electromagnetic waves to and from the reflector.

5. An interferometer according to claim 1, wherein the reflector is inside the main wave guide.

6. An interferometer according to claim 1, wherein the first and second side wave guides are mechanically dissimilar, the distance along the main wave guide between the two side wave guides being $(n - 1) \pi g/2$ where $n$ is an integer and $\pi g$ is the wavelength of the propagating wave in the main wave guide.

7. Apparatus according to claim 5, wherein the two side wave guides are positioned at the same distance along the length of the main wave guide whereby the two side wave guides respectively provide outputs proportional to the electric field and the magnetic field of the electromagnetic wave in the main waveguide.

8. A method of measuring the distance d of an object from a predetermined point, comprising the steps of
   propagating an electromagnetic wave past said predetermined point of said object,
   switching the frequency of the electromagnetic wave alternately between two frequencies,
   reflecting said electromagnetic wave from said object substantially without loss back past said predetermined point to set up a standing wave,
   measuring the magnitudes $Ay$ and $Ay + \Delta Ay$ of said switched wave at said predetermined point,
   measuring the magnitudes $Ax$ and $Ax + \Delta Ax$ of said switched wave at a further point such that the phase difference between the two sets of measured signals is an odd number of $\pi$ radians, and
   determining the distance of the object from the predetermined point from the formula $$\cos 2\phi = \pm \left(E + \frac{1}{E}\right) \frac{\frac{\Delta Ax}{Ax} + \frac{\Delta Ay}{Ay}}{\frac{\Delta Ax}{Ax} - \frac{\Delta Ay}{Ay}}$$

where $2\phi = 4\pi d/\lambda g$, $\lambda g$ is the wavelength of the electromagnetic wave, and E is the loss factor due to reflection of the wave.

* * * * *